(12) United States Patent
Lee et al.

(10) Patent No.: US 11,109,118 B2
(45) Date of Patent: Aug. 31, 2021

(54) HUB AND ELECTRONIC DEVICE INCLUDING THE SAME

(71) Applicant: LG ELECTRONICS INC., Seoul (KR)

(72) Inventors: Ji Woong Lee, Incheon (KR); Yoon Seok Choi, Gwangmyeong-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/813,159

(22) Filed: Mar. 9, 2020

(65) Prior Publication Data

US 2021/0168469 A1   Jun. 3, 2021

(30) Foreign Application Priority Data

Dec. 3, 2019   (KR) .......................... 10-2019-0159333

(51) Int. Cl.
*H04N 21/81* (2011.01)
*G06F 3/01* (2006.01)
(Continued)

(52) U.S. Cl.
CPC .......... *H04N 21/8146* (2013.01); *G06F 3/011* (2013.01); *H04N 21/2343* (2013.01); *H04N 21/4122* (2013.01); *H04N 21/4126* (2013.01); *H04N 21/433* (2013.01); *H04N 21/43615* (2013.01)

(58) Field of Classification Search
CPC ......... H04N 21/8146; H04N 21/43615; H04N 21/4122; H04N 21/433; H04N 21/4126; H04N 21/2343; G06F 3/011
See application file for complete search history.

(56) References Cited

U.S. PATENT DOCUMENTS 9,734,634 B1 *   8/2017   Mott ...................... G06F 3/0304
2014/0317659 A1 * 10/2014   Yasutake .......... H04N 21/43615
                                                                725/43

(Continued)

FOREIGN PATENT DOCUMENTS

| KR | 10-2011-0046703 A | 5/2011 |
| WO | WO-2015/015479 A1 * | 2/2015 | ............. G06T 19/00 |
| WO | WO-2019111027 A1 * | 6/2019 | ........... G06F 3/0304 |

*Primary Examiner* — Fernando Alcon
(74) *Attorney, Agent, or Firm* — Birch, Stewart, Kolasch & Birch, LLP

(57) ABSTRACT

Provided are a hub capable of sharing specific content according to a plurality of augmented reality (AR) devices and an electronic device including the same. The electronic device according to an aspect of the present disclosure includes a hub, and a plurality of AR devices configured to transmit and receive data to and from the hub, in which the hub includes a collector configured to collect content implemented on the augmented reality devices, a storage configured to store the collected content, a modifier configured to modify the content to correspond to an event when the event occurs in the augmented reality device, and a transmitter configured to transmit the modified content to the augmented reality device. An electronic device according to the present disclosure may be associated with an artificial intelligence module, a robot, an AR device, a virtual reality (VR) device, and a device related to 5G services.

14 Claims, 11 Drawing Sheets

(51) Int. Cl.
    *H04N 21/433*     (2011.01)
    *H04N 21/2343*     (2011.01)
    *H04N 21/41*     (2011.01)
    *H04N 21/436*     (2011.01)

(56) References Cited

U.S. PATENT DOCUMENTS

| | | | |
|---|---|---|---|
| 2016/0151705 A1* | 6/2016 | Ji | H04N 21/4223 463/29 |
| 2016/0253835 A1* | 9/2016 | Conness | G06F 3/013 715/716 |
| 2016/0300392 A1* | 10/2016 | Jonczyk | G06T 7/536 |
| 2018/0096529 A1* | 4/2018 | Menard | G06F 3/04847 |
| 2019/0197789 A1* | 6/2019 | Macauley | G11B 27/00 |
| 2019/0206129 A1* | 7/2019 | Khalid | A63F 13/88 |
| 2019/0371073 A1* | 12/2019 | Harviainen | G06F 3/011 |
| 2020/0019295 A1* | 1/2020 | Spivack | G06F 3/1454 |

\* cited by examiner

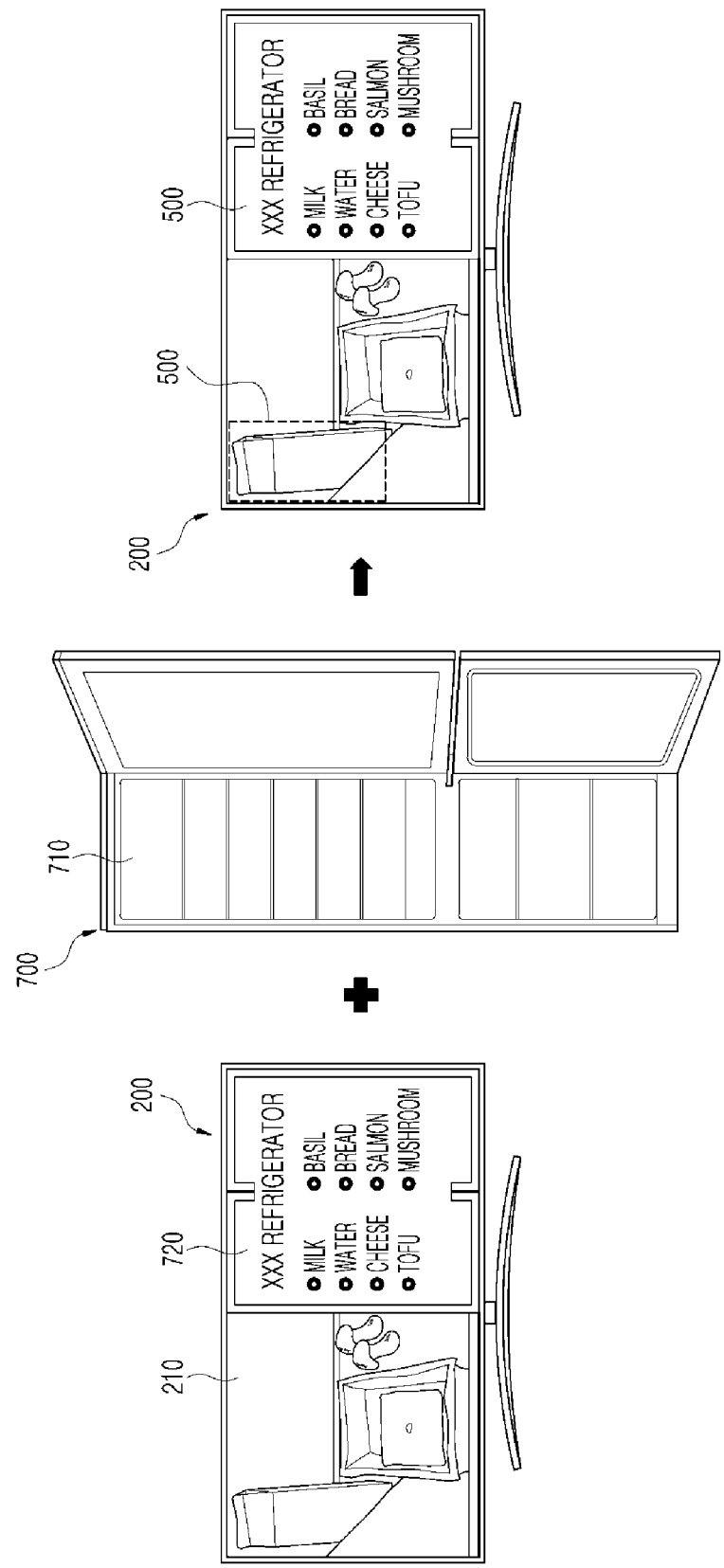

HUB AND ELECTRONIC DEVICE INCLUDING THE SAME

CROSS-REFERENCE TO RELATED APPLICATION

This present application claims the benefit of priority to Korean Patent Application No. 10-2019-0159333, entitled "Hub and Electronic device including the same" filed on Dec. 3, 2019, in the Korean Intellectual Property Office, the entire disclosure of which is incorporated herein by reference.

BACKGROUND

1. Technical Field

The present disclosure relates to a hub and an electronic device including the same, and more particularly, to a hub that can share specific content according to a plurality of augmented reality (AR) devices, and an electronic device including the same.

2. Description of Related Art

Augmented reality (AR) refers to technology that makes a virtual object or information interwoven with the real world, making the virtual object or information perceived as if existing in reality.

The virtual environment or situation stimulates the five senses of a user, allows the user to have a spatio-temporal experience similar to the one perceived from the real world, and thereby allows the user to freely cross the boundary between reality and imagination.

In addition, the user may not only be immersed in such an environment, but may also interact with objects implemented in the environment by manipulating or giving a command to the objects through an actual device.

Augmented reality-based devices capable of implementing augmented reality are being developed in various ways, and as such, types of augmented reality devices are also very diverse. Examples of augmented reality devices may include smartphones, smart TVs and smart mirrors, and the augmented reality devices can provide various types of content to users by synthesizing virtual objects or information in a real environment.

However, in the case of the various augmented reality devices as described above, the types of content to be implemented are different, such that users are provided with respectively different content for each device.

As a result, technologies of providing continuous and common content through each augmented reality device have not yet been developed. More specifically, there is a technical limitation in that it is difficult in actuality to collectively implement a particular type of content on every augmented reality device.

Therefore, being able to share and match particular content to a plurality of augmented reality devices is intimately linked to consumer convenience, and as such technology thereof are being actively developed.

In relation to the augmented reality device as described above, Korean Patent Application Publication No. 10-2011-0046703 (hereinafter, referred to as "related art") discloses an augmented reality providing system and method using server-side distributed image processing.

Specifically, the related art discloses a configuration for a more simplifying and lightening terminal by reducing load on the terminal through allowing a server to perform image processing necessary to provide an augmented reality service and providing the processed image to the terminal in real time through a network.

However, the related art discloses a configuration in which the augmented reality providing system provides specific content from a separate server to the augmented reality device, but does not explicitly disclose a configuration in which the augmented reality providing system shares the corresponding content between different augmented reality devices.

Specifically, the related art does not consider a configuration in which a user receives continuous and common content through a plurality of augmented reality devices.

As described above, an electronic device including an augmented reality device faces issues relating to sharing specific content according to a plurality of augmented reality devices, and these issues have not been appropriately considered with the existing electronic devices.

SUMMARY OF THE INVENTION

Embodiments of the present disclosure are directed to addressing the above shortcomings with existing hubs and electronic devices including the same.

Specifically, embodiments of the present disclosure are directed to sharing corresponding content among a plurality of augmented reality devices by modifying specific content to correspond to each augmented reality device.

Embodiments of the present disclosure are further directed to continuously implementing specific content via a plurality of augmented reality devices such that a user receives synchronized content from each augmented reality device to have a consistent user experience.

Embodiments of the present disclosure are also directed to implementing specific content via an augmented reality device, updating the corresponding content according to interaction information of the user regarding the specific content, and then supplying the updated content to a user again.

The present disclosure is not limited to what has been described above, and other aspects not mentioned herein will be apparent from the following description to one of ordinary skill in the art to which the present disclosure pertains.

A hub and an electronic device including the same according to an aspect of the present disclosure are configured to modify and then transmit specific content according to an augmented reality device. Specifically, the content is collected from a hub capable of transmitting and receiving data to and from the plurality of augmented reality devices, and then modified and transmitted according to each augmented reality device.

The hub and electronic device including the same according to the aspect of the present disclosure are configured so that the specific content is continuously implemented via the plurality of augmented reality devices. Specifically, the content implemented in the plurality of augmented reality devices is collected and stored, and then is modified and implemented to correspond to an event when the event occurs in a specific augmented reality device.

Here, the hub and the electronic device including the same according to the aspect of the present disclosure may collect content for each augmented reality device that is being driven in real time, even if a separate control signal is not inputted.

In addition, the hub and the electronic device including the same according to the aspect of the present disclosure may modify the same content differently by reflecting the characteristics of each augmented reality device, and provide the modified content to each of the augmented reality devices.

In addition, the hub and electronic device including the same according to the aspect of the present disclosure are configured to reflect interaction information of the user regarding the specific content. Specifically, the hub and the electronic device including the same are configured to implement the specific content via the augmented reality device, and then input the interaction information of the user regarding the specific content.

Here, the hub and the electronic device including the same according to the aspect of the present disclosure may remodify the corresponding content by reflecting the input interaction information.

In addition, the electronic device according to the aspect of the present disclosure may modify clothing content of broadcast content implemented on a smart TV, and may implement the modified clothing content as an augmented reality image by adding the modified clothing content to a user image inputted to a smart mirror.

Here, the electronic device according to the aspect of the present disclosure may remodify the clothing content by reflecting the augmented reality image implemented on the smart mirror which is being driven in real time, and then implement the remodified content on the smart TV.

In addition, the electronic device according to the aspect of the present disclosure may modify object content of broadcast content implemented on a smart TV, and may implement the modified object content as the augmented reality image by adding the modified object content to an image photographed via a smartphone.

Here, the electronic device according to the aspect of the present disclosure may remodify object content by reflecting the augmented reality image implemented on the smartphone which is being driven in real time, and then implement the remodified object content on the smart TV.

In addition, the electronic device according to the aspect of the present disclosure may modify user content inputted to a first smart mirror, and may implement the modified content as the augmented reality image by adding the modified content to a user image inputted to a second smart mirror.

Here, the electronic device according to the aspect of the present disclosure may remodify the user content by reflecting the augmented reality image implemented on the second smart mirror which is being driven in real time, and then implement the remodified user content in the first smart mirror.

In addition, the electronic device according to the aspect of the present disclosure may modify delivery information content of the broadcast content implemented on the smart TV and the object content implemented on the smartphone, and may implement the modified delivery information content and the object content as the augmented reality image by adding the modified delivery information content and the object content to an output image displayed in a smart wall pad.

Here, the electronic device according to the aspect of the present disclosure may remodify the delivery information content by reflecting the augmented reality image implemented on the smart wall pad which is being driven in real time and then implement the remodified delivery information content on the smart TV.

In addition, the electronic device according to the aspect of the present disclosure may remodify the object content by reflecting the augmented reality image implemented on the smart wall pad which is being driven in real time and then implement the remodified object content in the smartphone.

In addition, the electronic device according to the aspect of the present disclosure may modify recipe content of the broadcast content implemented on the smart TV and ingredients content implemented on a smart refrigerator, and may implement the modified recipe content and the modified ingredients content as an augmented reality image by adding the modified recipe content and the modified ingredients content to the recipe content displayed on the smart TV.

Aspects which can be achieved by the present disclosure are not limited what has been disclosed hereinabove and other aspects can be clearly understood from the following description by those skilled in the art to which the present disclosure pertains.

Hereinafter, the effects of the hub and the electronic device including the same according to the present disclosure will be described as follows.

According to at least one of the embodiments of the present disclosure, since the content is collected in the hub capable of transmitting and receiving data to and from the plurality of augmented reality devices and then modified according to each augmented reality device and transmitted, the corresponding content may be provided to the user by being shared among the plurality of augmented reality devices.

In addition, according to at least one of the embodiments of the present disclosure, since the content implemented in the plurality of augmented reality device is collected and stored, and then modified to correspond to an event when the event occurs in the specific augmented reality device, the specific content is continuously implemented through the plurality of augmented reality devices, thereby improving user convenience.

Further, according to at least one of the embodiments of the present disclosure, even if a separate control signal is not inputted, the content is collected for each of the augmented reality devices which are being driven in real time, thus smoothly implementing the content among each of the augmented reality devices.

In addition, according to at least one of the embodiments of the present disclosure, the same content is modified differently by reflecting the characteristics of each augmented reality device, and provided to each of the augmented reality devices, thereby enabling the shared content to be smoothly implemented in each of the augmented reality devices.

In addition, according to at least one of the embodiments of the present disclosure, the interaction information of the user on the specific content is inputted after the specific content is implemented in the augmented reality device, thereby enabling the interaction information of the user regarding the corresponding content to also be shared among the plurality of augmented reality devices.

In addition, according to at least one of the embodiments of the present disclosure, the corresponding content is remodified by reflecting the inputted interaction information, thereby enabling the state of the content provided to the user to be appropriately updated according to the situation required by the user.

In addition, according to at least one of the embodiments of the present disclosure, the augmented reality image is implemented by modifying the clothing content of the broadcast content implemented on the smart TV, and then adding the modified costume image to the user image inputted to the smart mirror, thereby enabling the state in which the user virtually wears the recognized specific item of clothing to be easily checked while watching the smart TV.

In addition, according to at least one of the embodiments of the present disclosure, the clothing content is remodified by reflecting the augmented reality image implemented onto the smart mirror which is being driven in real time and then the remodified clothing content is implemented on the smart TV, thereby enabling the state in which the user virtually wears the specific item of clothing to be easily checked even on the smart TV.

In addition, according to at least one of the embodiments of the present disclosure, the augmented reality image is implemented by modifying the object content of the broadcast content implemented on the smart TV, and adding the modified object content to the image photographed by the smartphone, thereby enabling the state in which a specific content recognized while watching the smart TV is virtually installed around the user to be easily checked.

In addition, according to at least one of the embodiments of the present disclosure, the object content is remodified by reflecting the augmented reality image implemented on the smartphone which is being driven in real time and implemented on the smart TV, thereby enabling the state in which the specific object is virtually installed around the user to be easily checked even on the smart TV.

In addition, according to at least one of the embodiments of the present disclosure, the augmented reality image is implemented by modifying the user content inputted to the first smart mirror and then adding the modified user content to the user image inputted to the second smart mirror, thereby enabling the state in which the changes in each part of the body of the user are virtually synthesized to be easily checked.

In addition, according to at least one of the embodiments of the present disclosure, the user content is remodified by reflecting the augmented reality image implemented on the second smart mirror which is being driven in real time and then the remodified user content is implemented on the first smart mirror, thereby enabling the state in which the changes in each part of the body of the user are virtually synthesized to be easily checked, even if the order of the changes in each part of the body of the user is different.

In addition, according to at least one of the embodiments of the present disclosure, the augmented reality image is implemented by modifying the delivery information content of the broadcast content implemented on the smart TV and the object content implemented on the smartphone, and then adding the modified content to the output image displayed on the smart wall pad, thereby enabling the order information of the specific object through home shopping to be intuitively checked.

Further, according to at least one of the embodiments of the present disclosure, the delivery information content is remodified by reflecting the augmented reality image implemented on the smart wall pad which is being driven in real time and then the remodified delivery information content is implemented on the smart TV, thereby enabling the order information of the specific object to be easily checked even on the smart TV.

In addition, according to at least one of the embodiments of the present disclosure, the object content is remodified by reflecting the augmented reality image implemented on the smart wall pad which is driven and then implemented on the smartphone, thereby enabling the state in which the specific object being delivered is virtually installed around the user to be easily checked.

Further, according to at least one of the embodiments of the present disclosure, the augmented reality image is implemented by modifying the recipe content of the broadcast content implemented on the smart TV and the ingredients content implemented on the smart refrigerator, and then adding the modified recipe content and the modified ingredients content to the recipe content displayed on the smart TV, thereby enabling the specific recipe recognized while watching the smart TV to be more easily applied in real life.

Further scope of applicability of the present disclosure will be apparent from the above detailed description. It should be understood, however, that specific examples, such as the detailed description and the preferred embodiments of the present disclosure, are given by way of illustration only, since various changes and modifications within the spirit and scope of the present disclosure will become apparent to those skilled in the art.

BRIEF DESCRIPTION OF THE DRAWINGS

The above and other aspects, features, and advantages of the present disclosure will become apparent from the detailed description of the following aspects in conjunction with the accompanying drawings, in which:

FIG. 11 is a diagram showing a fifth example of the state of using the electronic device according to the embodiment of the present disclosure.

DETAILED DESCRIPTION

Wherever possible, the same reference numbers will be used throughout the drawings to refer to the same or like parts. In the following description, known functions or structures, which may confuse the substance of the present disclosure, are not explained.

Figure 1:
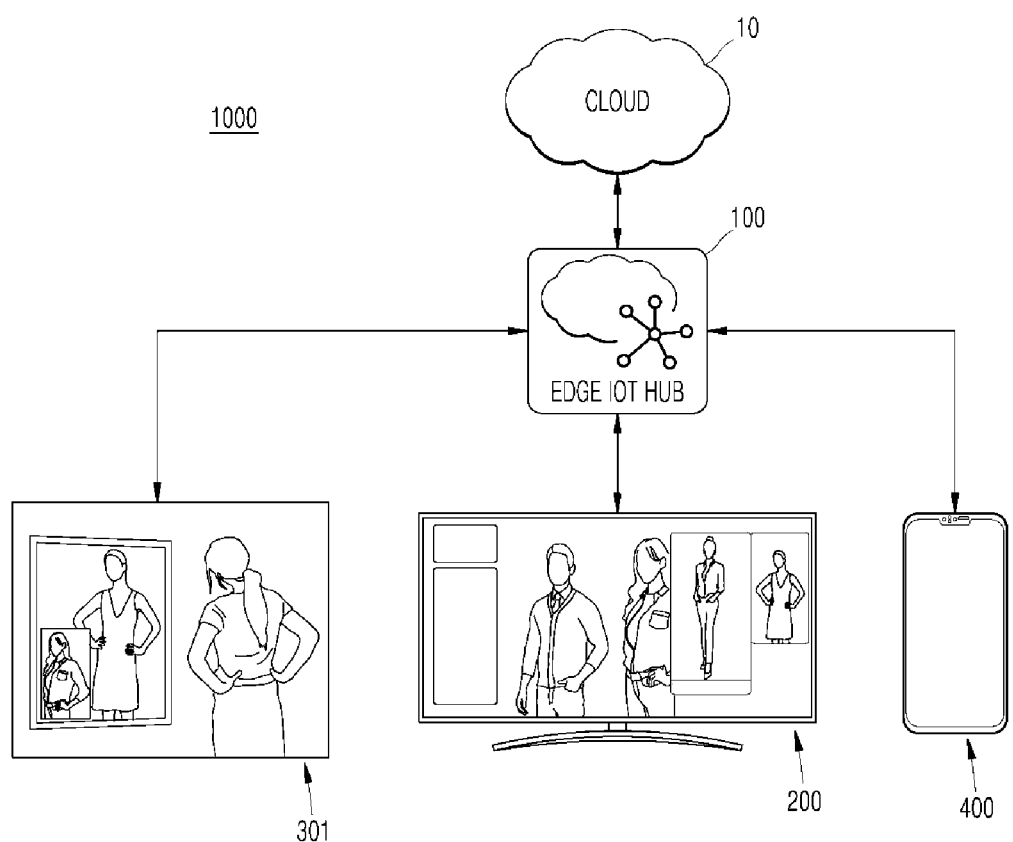
FIG. 1 is a diagram schematically showing an electronic device according to an embodiment of the present disclosure.
Figure 2:
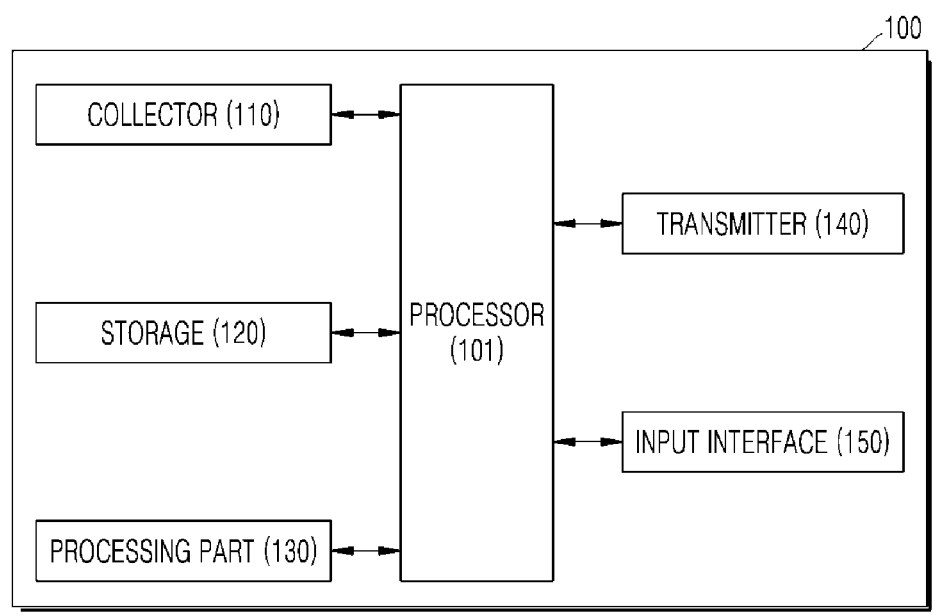
FIG. 2 is a diagram showing in more detail a specific configuration of a hub in the electronic device according to the embodiment of the present disclosure.

FIG. 1 is a diagram schematically showing an electronic device according to an embodiment of the present disclosure. FIG. 2 is a diagram showing in more detail a detailed configuration of a hub in the electronic device according to an embodiment of the present disclosure.

As shown in FIGS. 1 and 2, an electronic device 1000 according to an embodiment of the present disclosure includes a hub 100 and a plurality of augmented reality (AR) devices 200, 301, and 400.

The hub 100 is a part that communicates with the augmented reality devices 200, 301, and 400 disposed in a set network area, and may be installed in a network area specified by a user to perform transmission and reception of data to and from devices communicatively connected, and a control function of the devices.

For example, the hub 100 may be configured to perform a hub device function of home Internet of Things and exchange or control data with devices disposed in a network area within a predetermined range from the hub 100.

Moreover, the hub 100 may be provided as an individual device separately installed, or may be installed to be embedded in another device (for example, a refrigerator or a TV) in the home.

The network may be a wired and wireless network, for example, a local area network (LAN), a wide area network (WAN), the Internet, an intranet and an extranet, and any suitable communication network including a mobile network, for example, cellular, 3G, 4G, LTE, 5G, and Wi-Fi networks, an ad hoc network, and a combination thereof.

More specifically, when using a 5G network, the above-described artificial intelligence algorithm may be more smoothly applied according to characteristics of ultra-low latency and hyper-connectivity, and smoothly implement the Internet of Things (IoT) technology in conjunction with devices other than the augmented reality devices 200, 301, and 400.

In this case, the network may include connection of network elements such as bridges, routers, switches, and gateways. The network may include one or more connected networks, such as a multiple network environment, including a public network such as the Internet and a private network such as a secure corporate private network. Access to the network may be provided via one or more wired or wireless access networks.

The augmented reality devices 200, 301, and 400 may be parts that transmit and receive data to and from the hub 100, and may implement content provided from the hub 100 based on augmented reality. Here, the augmented reality technology is a technology that synthesizes a virtual object or information content provided from the hub 100 into a real environment to look like an object existing in the original environment.

This augmented reality technology can be applied to, for example, a head-mount display (HMD), a head-up display (HMD), a mobile phone, a tablet PC, a laptop, a desktop, TV, and a digital signage, and the apparatus to which the augmented reality technology is applied may be referred to as the augmented reality devices 200, 301, and 400.

In the electronic device 1000 according to the present embodiment, the hub 100 includes a collector 110, a storage 120, a modifier 130, and a transmitter 140. In this case, the collector 110, the storage 120, the modifier 130, and the transmitter 140 may be respectively controlled by a processor 101.

The collector 110 is a part that collects content implemented in the augmented reality devices 200, 301, and 400, and may collect content suitable for peripheral devices from an external server 10 such as a cloud or the Internet.

Herein, the content may include applications executed on a related device, various types of data such as a photo, video, audio and text which are being played or executed on the applications, multimedia data, and meta information on content.

The applications may include general applications such as a media player that plays content, and web applications that provide a variety of web services, including providing content through communication with an external server 10.

Unlike augmentation information, meta information of the content is information on the content itself, and may be information used to search for the content. For example, when the content is broadcast content 210, the meta information may include, for example, broadcast channel information on which the corresponding broadcast content 210 is broadcast, a broadcast title, broadcast time information, broadcast turn information indicating the number of broadcasts and performer information.

The status information may include status information (for example, volume and playback time information) on the content. The status information may include various information used for content synchronization by reproducing a content execution status of another device unchanged.

In addition, the status information may further include the status information (for example screen brightness) on the device providing the content. For example, when the executing application is a video playing program, the content may be a video file being played by the video playing program, and the status information may be, for example, a playback volume and play time information.

The augmentation information may include, for example, additional information that may be provided by being added to the content, playback control information for controlling the playback of the content, and an application that may be executed in conjunction with the content. For example, when the content is a drama or a movie, the augmentation information may include introduction information and the like on, for example, a shooting place, an OST, a plot and an actor.

When the content is a sports broadcast program, the augmentation information may include game statistics information, and when the content is a music program, the augmentation information may include, for example, a singer and music introduction information.

The augmentation information may be configured to allow interaction with the user, and may be configured to perform a preset operation or provide detailed information linked to the selected augmentation information according to the user selection of the corresponding augmentation information. For example, according to a user input signal to select the augmentation information, services such as a purchase or a payment may be performed.

The storage 120 is a part that stores the collected content, and may non-selectively store the content collected through a separate memory.

The modifier 130 is a part that modifies content to correspond to an event when the event occurs in the augmented reality devices 200, 301, and 400, and may modify the content through a method of, for example, merging the above-described status information or augmentation information with content.

Alternatively, the modifier 130 may modify the content into sizes, angles, and layouts most suitable to be implemented by each of the augmented reality devices 200, 301, and 400.

In this case, the event refers to the states of each of the augmented reality devices 200, 301, and 400, and may include, for example, an on or off status, a type of operation being performed and an operation command inputted by a user.

The transmitter 140 is a part that transmits the modified content to the augmented reality devices 200, 301, and 400, and thus may transmit the modified content including a wired and wireless transmitter.

As described above, the electronic device 1000 according to the embodiment of the present disclosure collects content from the hub 100 capable of transmitting and receiving data to and from the plurality of augmented reality devices 200, 301, and 400, and then modifies and transmits the content according to each of the augmented reality devices 200, 301, and 400, thus enabling the corresponding content to be provided to the user, being shared among the plurality of augmented reality devices 200, 301, and 400.

In addition, the electronic device 1000 according to the embodiment of the present disclosure collects and stores the content implemented in the plurality of augmented reality devices 200, 301, and 400, and then modifies the content to correspond to an event when the event occurs in the specific augmented reality devices 200, 301, and 400, thus enabling the specific content to be continuously implemented via the plurality of augmented reality devices 200, 301, and 400, thereby improving user convenience.

In the electronic device 1000 according to the embodiment of the present disclosure the collector 110 may automatically collect content for each of the augmented reality devices 200, 301, and 400 which are being driven in real time.

That is, the collector 110 may collect the content for the corresponding augmented reality devices 200, 301, and 400 without a separate content collection command as long as each of the augmented reality devices 200, 301, and 400 are being driven.

To this end, the status information of each of the augmented reality devices 200, 301, and 400 may be transmitted to the hub 100 (in specific, the collector 110), and the hub 100 may select the type of content which determines and collects the state of each of the augmented reality devices 200, 301, and 400.

As described above, the electronic device 1000 according to the embodiment of the present disclosure collects content for each of the augmented reality devices 200, 301, and 400 that are driven in real time even if a separate control signal is not inputted, thus enabling the content to be smoothly shared among any of the augmented reality devices 200, 301, and 400.

In the electronic device 1000 according to the embodiment of the present disclosure, the modifier 130 may modify content individually according to each of the augmented reality devices 200, 301, and 400 which are being driven in real time.

In other words, instead of modifying specific content uniformly, the content can be modified into various types in consideration of the characteristics of each of the augmented reality devices 200, 301, and 400.

To this end, the characteristic information on each of the augmented reality devices 200, 301, and 400 may be transmitted to the hub 100 (specifically, the modifier 130), and the hub 100 may modify content into a type most suitable to be implemented by reflecting the characteristics of each of the augmented reality devices 200, 301, and 400.

As described above, the electronic device 1000 according to the embodiment of the present disclosure may modify the same content differently by reflecting the characteristics of each of the augmented reality devices 200, 301, and 400 and provide the modified content to each of the augmented reality devices 200, 301, and 400, thus enabling the shared content to be smoothly implemented by each of the augmented reality devices 200, 301, and 400.

In the electronic device 1000 according to the embodiment of the present disclosure, the hub 100 may further include an input interface 150 through which the user interaction information on the content implemented in the augmented reality devices 200, 301, and 400 is inputted.

That is, when the modified content is implemented by any one of the augmented reality devices 200, 301, and 400, the user may input a separate command in response thereto. For example, the user may further specify content provided to the user or change the content to other content.

Therefore, when the interaction information of the user is input as described above, modifying the content by reflecting the inputted interaction information of the user may most appropriately reflect the requirements of the user.

Since the requirements of the user are preferably shared among each of the augmented reality devices 200, 301 and 400, when the interaction information of the user is generated in any one of the augmented reality devices 200, 301 and 400, it is necessary to input the interaction information of the user to the hub 100 through the input interface 150 and then transmit the interaction information of the user to the remaining augmented reality devices 200, 301, and 400.

As described above, in the electronic device 1000 according to an embodiment of the present disclosure, the specific content is implemented in the augmented reality devices 200, 301, and 400 and then the interaction information of the user on the specific content is inputted, thus enabling the interaction information of the user on the corresponding content to also be shared among the plurality of augmented reality devices 200, 301, and 400.

In the electronic device 1000 according to the embodiment of the present disclosure, the modifier 130 may remodify the content by reflecting the interaction information inputted through the input interface 150.

As described above, when the interaction information of the user is generated, it is necessary to modify the content to meet the requirements of the user accordingly. Therefore, the modifier 130 needs to remodify the corresponding content by reflecting the interaction information of the user and then provide the remodified content to each of the augmented reality devices 200, 301, and 400.

As described above, since the electronic device 1000 according to the embodiment of the present disclosure remodifies the corresponding content by reflecting the inputted interaction information, the electronic device 1000 may appropriately update the state of the content provided to the user according to the needs of the user.

Figure 3:
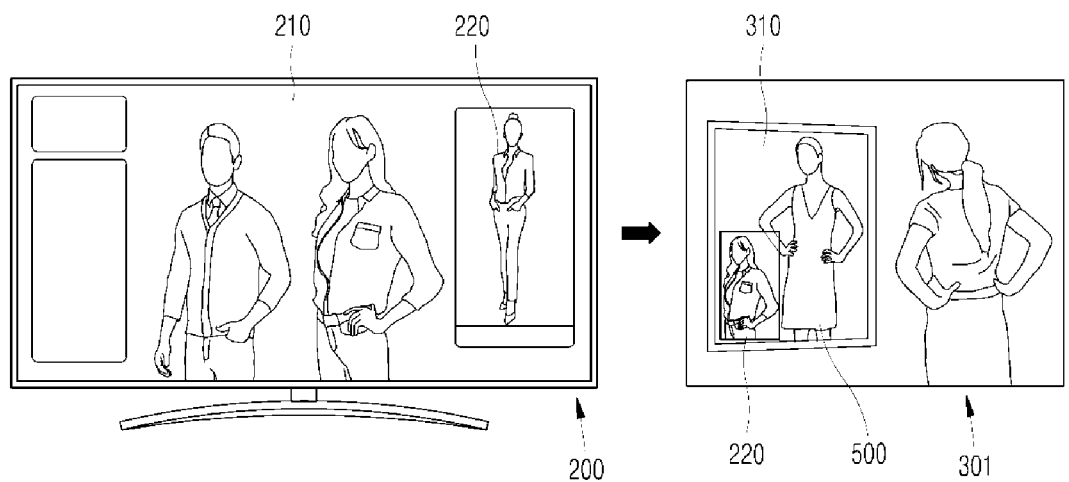
FIGS. 3 and 4 are diagrams showing a first example of a state of using the electronic device according to the embodiment of the present disclosure.
Figure 4:
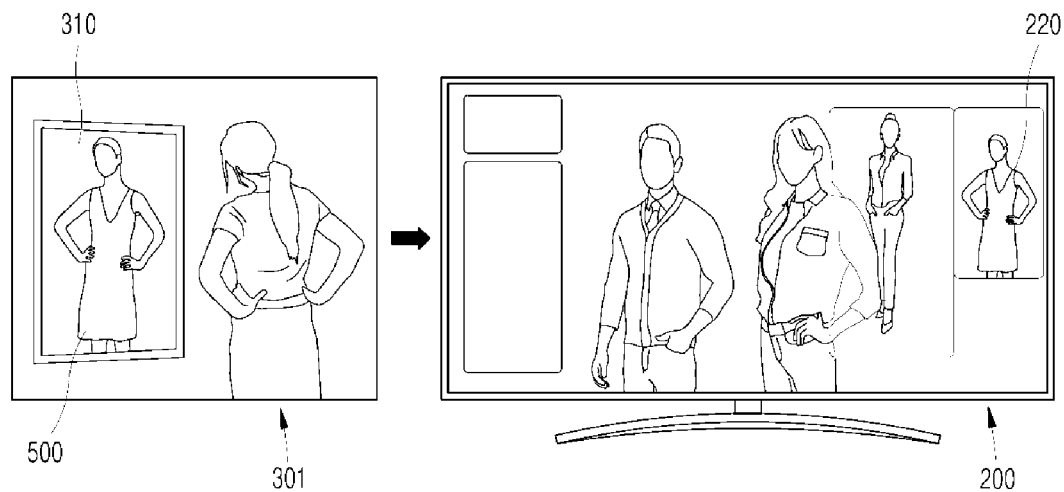

FIGS. 3 and 4 are diagrams showing a first example of a state of using the electronic device according to the embodiment of the present disclosure.

Referring to FIGS. 3 and 4, a first example of a state of using the electronic device 1000 according to the embodiment of the present disclosure will be described.

In this case, the hub 100 includes the collector 110, the storage 120, the modifier 130, and the transmitter 140. The augmented reality devices 200, 301, and 400 include the smart TV 200 and the smart mirror 301. In this case, the smart TV 200 refers to a TV to which the above-described augmented reality technology is applied, and the smart mirror 301 also refers to a mirror to which the above-described augmented reality technology is applied.

The collector 110 collects the broadcast content 210 implemented on the smart TV 200 which is being driven in real time, and the storage 120 stores the collected broadcast content 210.

In addition, the modifier 130 modifies clothing content 220 of the broadcast content 210 so as to be implemented on the smart mirror 301 when the smart mirror 301 is being driven, and the transmitter 140 transmits the modified clothing content 220 to the smart mirror 301.

That is, when the user wants to know a state of, for example, wearing a costume, through the smart mirror 301, the clothing content 220 of the broadcast content 210 is modified and then transmitted to the smart mirror 301.

According to the structure as described above, the smart mirror 301 implements an augmented reality image 500 by adding the clothing content 220 onto the user image 310 inputted in real time.

For example, the user may discover a specific item of clothing while watching the smart TV 200. In this case, the user may be curious about a state in which the costume would look like worn thereon. Therefore, the user may move to the smart mirror 301 to drive the smart mirror 301.

When the smart mirror 301 is driven, the hub 100 may modify the clothing content 220 of the broadcast content 210 collected and stored so as to be suitable to be implemented on the smart mirror 301, and transmit the modified clothing content to the smart mirror 301.

The clothing content 220 transmitted as described above is displayed to the user through the smart mirror 301, and the clothing content 220 is added onto the user image 310 inputted in real time to be implemented as the augmented reality image 500.

As described above, the electronic device 1000 according to an embodiment of the present disclosure modifies the clothing content 220 of the broadcast content 210 implemented on the smart TV 200 and adds the modified clothing content 220 to a user image 310 inputted to the smart mirror 301 to be implemented as the augmented reality image 500, thus enabling the state where the user virtually wears a specific item of clothing recognized while watching the smart TV 200 to be easily checked.

Here, the hub 100 further includes an input interface 150 to which the augmented reality image 500 implemented on the smart mirror 301 which is driven in real time, is inputted, wherein the modifier 130 may remodify the clothing content 220 so as to be implemented on the smart TV 200 by reflecting the augmented reality image 500 inputted through the input interface 150, and the transmitter 140 may transmit the remodified clothing content 220 to the smart TV 200.

For example, the user who checks the state of virtually wearing a specific item of clothing through the above-described process may not like the corresponding costume. In this case, the user may cancel the content of the corresponding costume and input his/her a self-image to the hub 100 through the mirror 301.

In addition, the input image may be remodified to be implemented through the smart TV 200 and then transmitted to the smart TV 200. As a result, the user who returns to the smart TV 200 may check how it looks to virtually wear a costume on the smart TV.

As described above, the electronic device 1000 according to the embodiment of the present disclosure remodifies the clothing content 220 by reflecting the augmented reality image 500 implemented on the smart mirror 301 which is being driven in real time and then implements the remodified clothing content on the smart TV 200, thus enabling the user to easily check the state of virtually wearing a specific item of clothing even on the smart TV (200).

Figure 5:
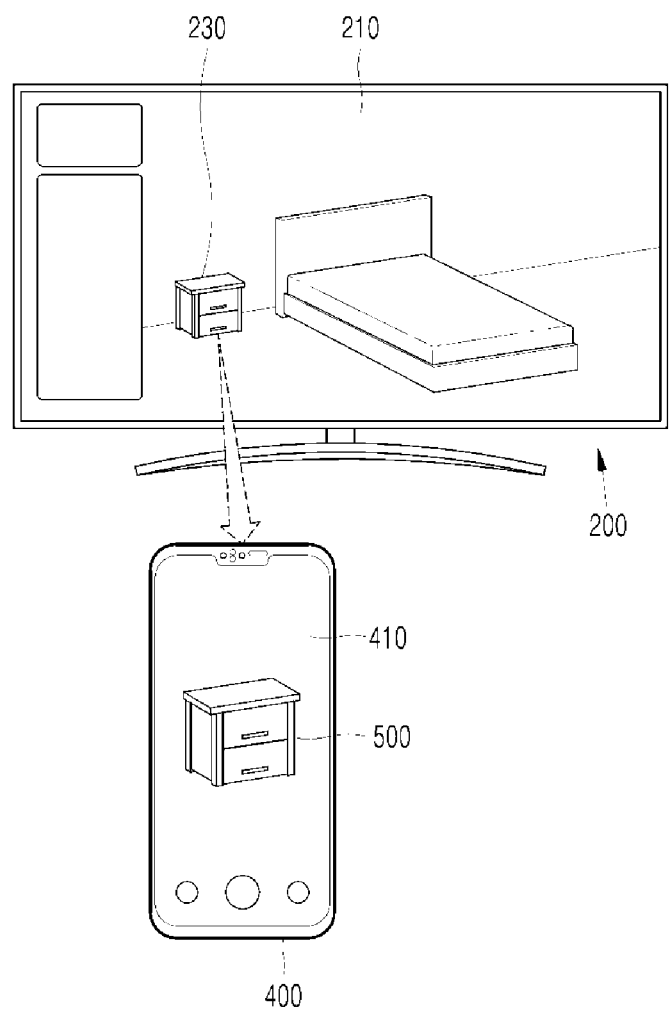
FIGS. 5 and 6 are diagrams showing a second example of a state of using the electronic device according to the embodiment of the present disclosure.
Figure 6:
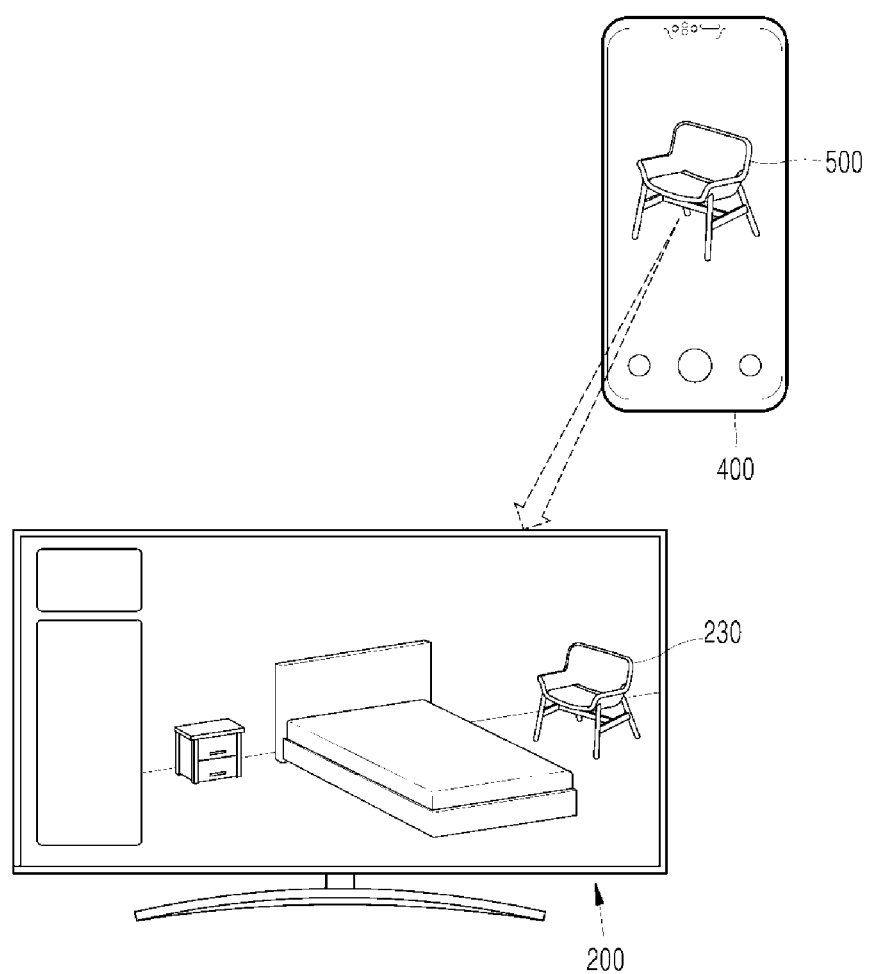

FIGS. 5 and 6 are diagrams showing a second example of a state of using the electronic device according to the embodiment of the present disclosure.

Referring to FIGS. 5 and 6, a second example of the state of using the electronic device 1000 according to the embodiment of the present disclosure will be described.

In this case, the hub 100 includes the collector 110, the storage 120, the modifier 130, and the transmitter 140. Further, the augmented reality devices 200, 301, and 400 include the smart TV 200 and the smartphone 400. In this case, the smartphone 400 also refers to a mobile phone to which the above-described augmented reality technology is applied.

The collector 110 collects the broadcast content 210 implemented on the smart TV 200 which is being driven in real time, and the storage 120 stores the collected broadcast content 210.

In addition, the modifier 130 modifies an object content 230 of the broadcast content 210 so as to be implemented on the smartphone 400 when the smartphone 400 is being driven, and the transmitter 140 transmits the modified object content 230 to the smartphone 400.

That is, the user modifies the object content 230 of the broadcast content 210 and transmits the modified object content to the smartphone 400 when the user wants to know, for example, an installation state of specific content through the smartphone 400.

According to the structure as described above, the smartphone 400 adds the object content 230 to an image 410 photographed in real time to be implemented as the augmented reality image 500.

For example, the user may find the specific content while watching the smart TV 200. In this case, the user may be curious about a state in which the corresponding object is installed around the user. Therefore, the user may drive the smartphone 400.

When the smartphone 400 is driven, the hub 100 may modify the object content 230 of the broadcast contents 210 collected and stored so as to be appropriately implemented on the smartphone 400, and transmit the modified object content to the smartphone 400.

The transmitted object content 230 is displayed to the user through the smartphone 400, and may be implemented as the augmented reality image 500 by being added to the image 410 photographed in real time.

As described above, the electronic device 1000 according to the embodiment of the present disclosure modifies the object content 230 of the broadcast content 210 implemented on the smart TV 200, and then adds the modified object image to the image 410 photographed by the smartphone 400 so as to be implemented as the augmented reality image 500, thus enabling the state, in which the specific object recognized while watching the smart TV 200 is virtually installed around the user, to be checked.

Here, the hub 100 further includes the input interface 150 to which the augmented reality image 500 implemented on the smartphone 400 which is being driven in real time is inputted, wherein the modifier 130 may remodify the object content 230 so as to be implemented on the smart TV 200 by reflecting the augmented reality image 500 inputted through the input interface 150, and the transmitter 140 may transmit the remodified object content 230 to the smart TV 200.

For example, the user may be curious about whether a specific object around the user goes well with an object on a screen being broadcast on the smart TV 200. In this case, the user may input an image of the specific object around the user to the hub 100 through the smartphone 400.

In addition, the inputted image may be remodified so as to be implemented through the smart TV 200, and then transmitted to the smart TV 200. As a result, the user who has returned to the smart TV 200 may check whether or not a specific object around the user goes well with the object on the screen being broadcast on the smart TV 200.

As described above, the electronic device 1000 according to the embodiment of the present disclosure may remodify the object content 230 by reflecting the augmented reality image 500 implemented on the smartphone 400 which is being driven in real time, and then implement the remodified object content on the smart TV 200, thus enable the state in which the specific object is virtually installed around the user even on the smart TV 200 to be checked.

Figure 7:
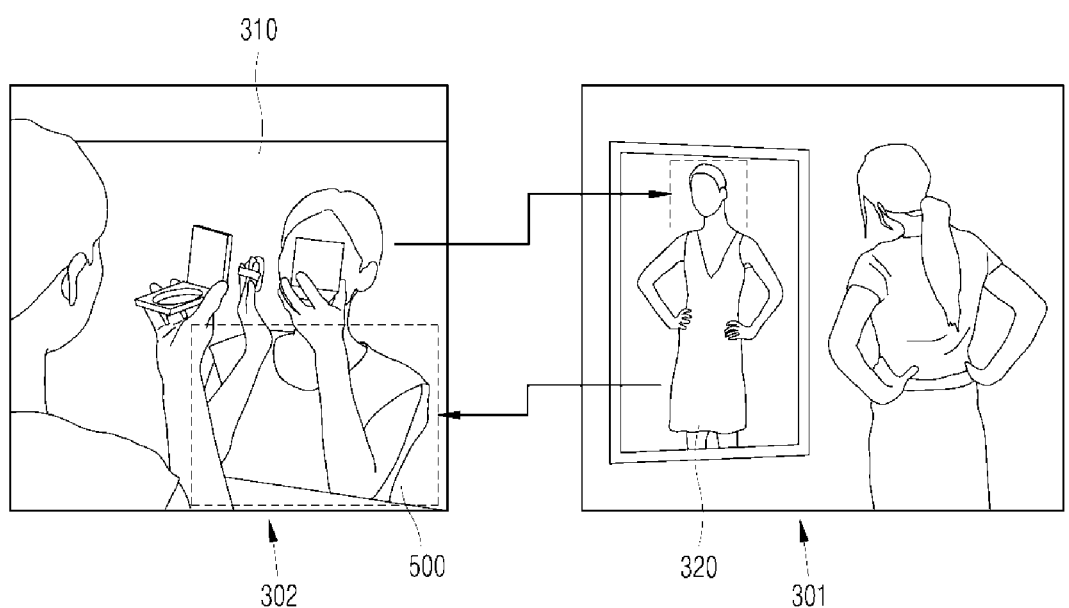
FIG. 7 is a diagram showing a third example of the state of using the electronic device according to the embodiment of the present disclosure.

FIG. 7 is a diagram showing a third example of the state of using the electronic device according to the embodiment of the present disclosure.

Referring to FIG. 7, a third example of a state of using the electronic device 1000 according to the embodiment of the present disclosure will be described.

In this case, the hub 100 includes the collector 110, the storage 120, the modifier 130, and the transmitter 140. Further, the augmented reality devices 200, 301, and 400 may include a first smart mirror 301 and a second smart mirror 302.

The collector 110 collects user content 320 inputted to the first smart mirror 301 which is being driven in real time, and the storage 120 stores the collected user content 320.

In addition, the modifier 130 modifies the user content 320 so as to be implemented on the second smart mirror 302 when the second smart mirror 302 is being driven, and the transmitter 140 transmits the user content 320 to the second smart mirror.

That is, when the user wants to know changes and the like of each part of the user body through the plurality of smart mirrors 301 and 302, the user content 320 of a part of the user body inputted to the first smart mirror 301 is transmitted to the second smart mirror 302.

According to the structure described above, the second smart mirror 302 may implement the user content 320 as the augmented reality image 500 by adding the object content 320 to the user image 310 inputted in real time.

For example, the user may want to match makeup suggested by the dressing table with clothes suggested by a wardrobe. In this case, the user may cause an appearance of wearing clothes through the first smart mirror 301 installed in a closet to be inputted.

As described above, the inputted image may be transmitted to the hub 100 as the user content 320 and modified so as to be suitable to be implemented on the second smart mirror 302 installed in the dressing table, and then transmitted to the second smart mirror 302.

In addition, when the user moves to the second smart mirror 302 to put on makeup, the user content 320 transmitted through the above process is displayed to the user through the second smart mirror 302, and the user content 320 may be implemented as the augmented reality image 500 by being added to the user image 310 inputted in real time.

As described above, the electronic device 1000 according to the embodiment of the present disclosure may implement the augmented reality image by modifying the user content 320 input to the first smart mirror 301 and then adding the modified user content 320 to the user image 310 input to the second smart mirror 302, thereby enabling the state in which the changes in each part of the body of the user are virtually synthesized to be easily checked.

Here, the hub 100 further includes the input interface 150 to which the augmented reality image 500 implemented on the second smart mirror 302 is inputted, the modifier 130 remodifies the user content 320 to be implemented on the first smart mirror 301 by reflecting the augmented reality image 500 inputted through the input interface 150, and the transmitter 140 may transmit the remodified user content 320 to the first smart mirror 301.

For example, unlike the process above described, the user may want to first put on makeup and clothes matching the makeup. In this case, the user may cancel the existing user content 320 and remove the image of user makeup completed may be inputted to the hub 100 through the second smart mirror 302.

In addition, the inputted image may be remodified to be implemented through the first smart mirror 301 and then transmitted to the first smart mirror 301. As a result, the user which returns to the first smart mirror 301 may check an appearance of virtually wearing different clothes in the first smart mirror 301.

As described above, the electronic device 1000 according to the embodiment of the present disclosure remodifies the user content 320 by reflecting the augmented reality image 500 implemented on the second smart mirror 302 which is being driven in real time, and then is implemented on the first smart mirror 301, thus enabling the virtually synthesized state even if the order of changes in each part of the user body is different, to be easily checked.

Figure 8:
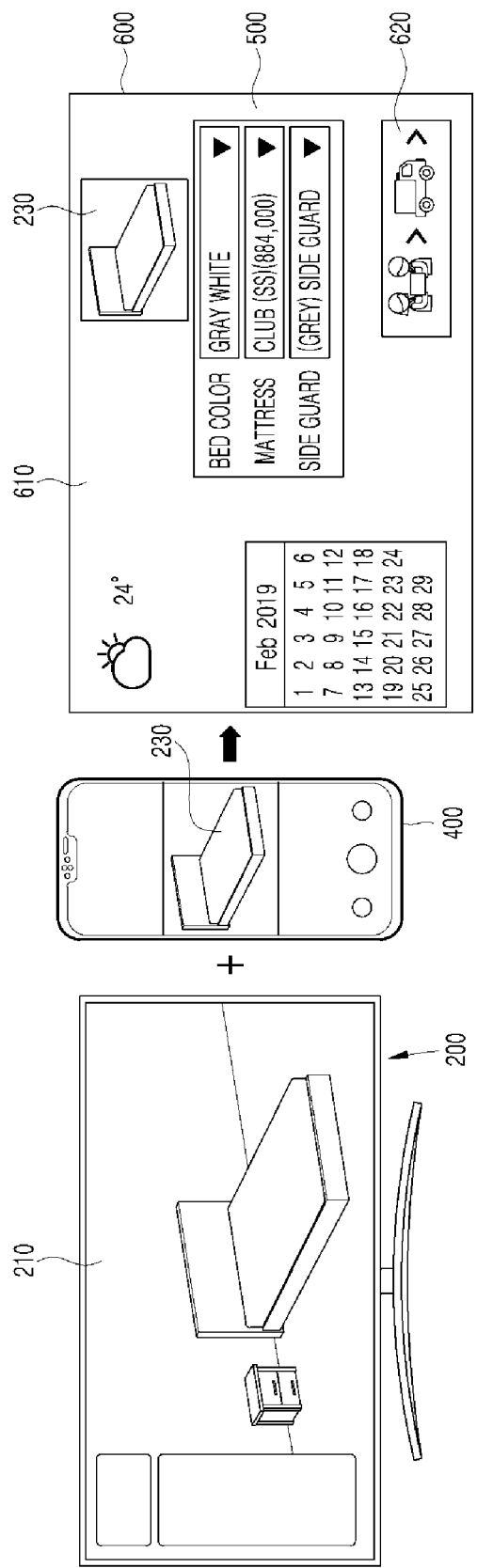
FIGS. 8 to 10 are diagrams showing a fourth example of the state of using the electronic device according to the embodiment of the present disclosure.
Figure 9:
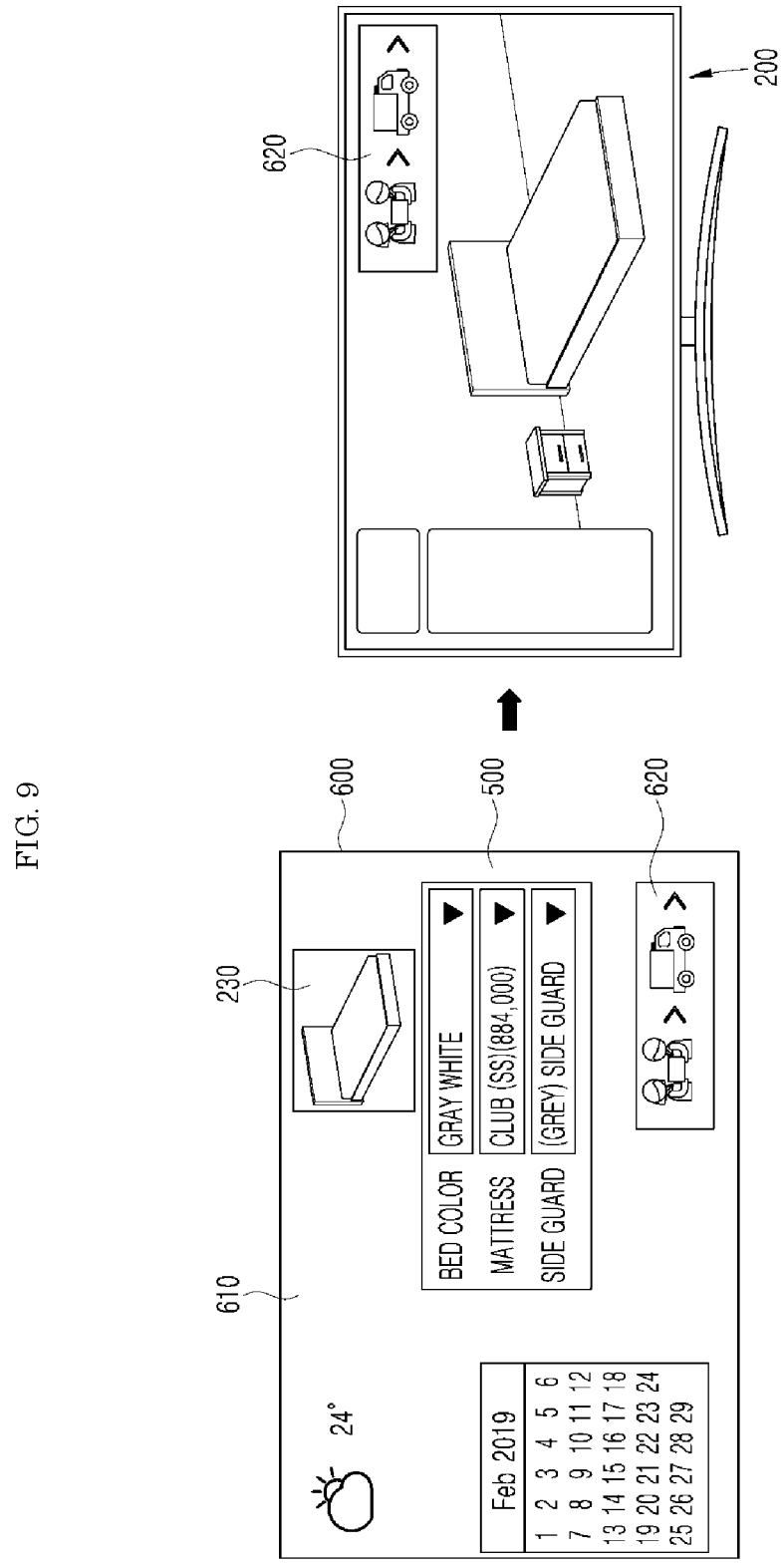
Figure 10:
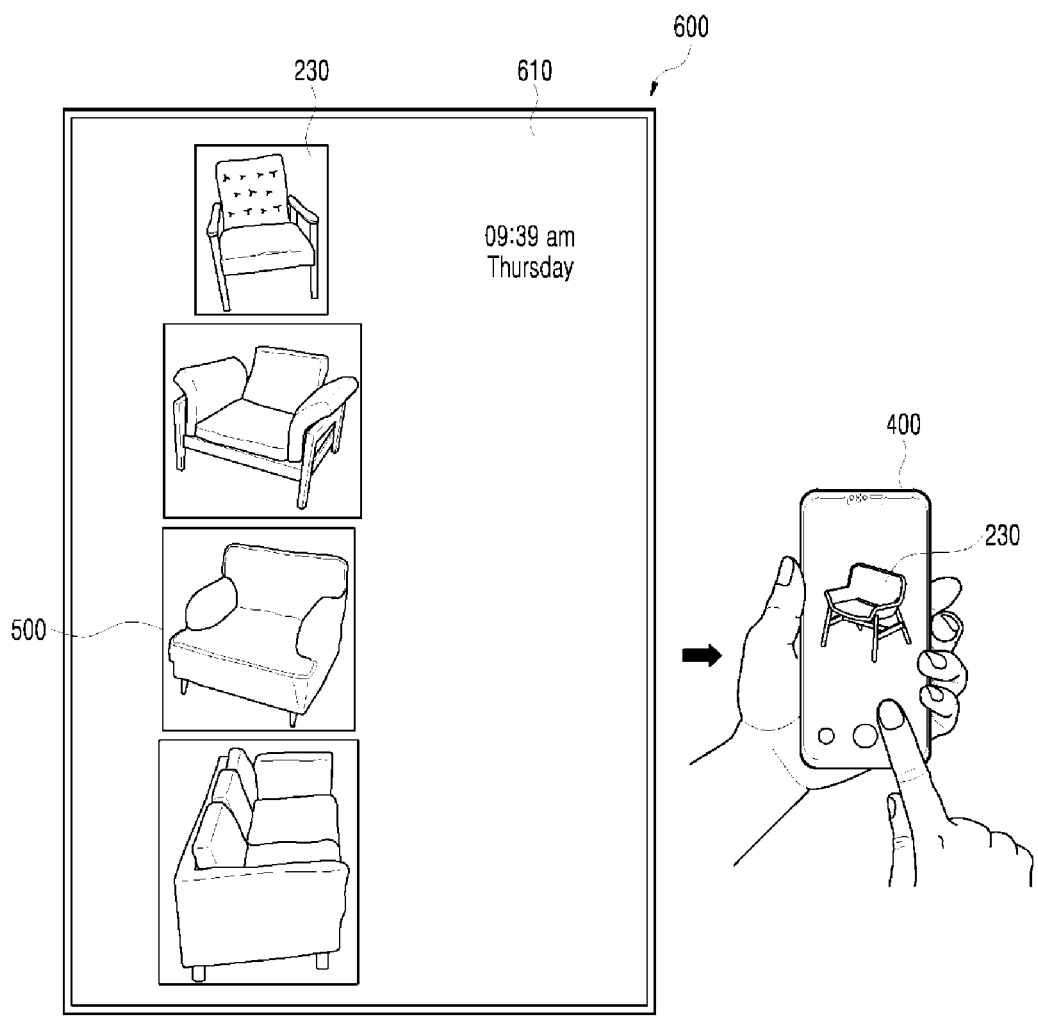

FIGS. 8 to 10 are diagrams showing a fourth example of the state of using the electronic device according to the embodiment of the present disclosure.

FIGS. 8 to 10, a fourth example of a state of using the electronic device 1000 according to the embodiment of the present disclosure will be described.

In this case, the hub 100 includes the collector 110, the storage 120, the modifier 130, and the transmitter 140. The augmented reality devices 200, 301, and 400 include the smart TV 200, the smartphone 400, and the smart wall pad 600. In this case, the smart wall pad 600 is a pad to which the above-described augmented reality technology is applied, and is referred to as an apparatus that is provided on a wall body and the like to input and output various information by the user.

The collector 110 collects the broadcast content 210 implemented on the smart TV 200 which is being driven in real time and the object content 230 implemented on the smartphone 400, and the storage 120 stores the collected broadcast content 210 and object content 230.

In addition, the modifier 130 modifies a delivery information content 620 of the broadcast content 210 and the object content 230 so as to be implemented on the smart wall pad 600 when the smart wall pad 600 is driven, and the transmitter 140 transmits the modified delivery information content 620 and object content 230 to the smart wall pad 600.

According to the structure as described above, the smart wall pad 600 adds the delivery information content 620 and the object content 230 to the output image 610 to be displayed in real time so as to be implemented as the augmented reality image 500.

For example, a user may order a specific object through home shopping while watching the smart TV 200. In this case, the user may be curious about whether the delivery information of the corresponding object and the state of the corresponding object are installed around the user.

Accordingly, the electronic device 1000 according to the embodiment of the present disclosure may modify the delivery information content 620 of the broadcast content 210 implemented on the smart TV 200 and the object content 230 implemented on the smartphone 400, and then add the modified content to the output image 610 displayed on the smart wall pad 600 so as to be implemented as the augmented reality image, thus enabling order information of a specific object through the home shopping to be intuitively checked.

Here, the hub 100 further includes the input interface 150 to which the augmented reality image 500 implemented on the smart wall pad 600 which is being driven in real time is inputted, the modifier 130 may remodify delivery information content 620 to be implemented on the smart TV 200 by reflecting the augmented reality image 500 inputted through the input interface 150, and the transmitter 140 may transmit the remodified delivery information content 620 to the smart TV 200.

Accordingly, the electronic device 1000 according to the embodiment of the present disclosure may remodify the delivery information content 620 by reflecting the augmented reality image 500 implemented on the smart wall pad 600 which is being driven in real time, and then implemented on the smart TV 200, thus enabling the order information of the specific object even on the smart TV 200 to be easily checked.

Here, the hub 100 further includes the input interface 150 to which the augmented reality image 500 implemented on the smart wall pad 600 which is being driven in real time is inputted, wherein the modifier 130 remodifies the object content 230 to be implemented on the smartphone 400 by reflecting the augmented reality image 500 inputted through the input interface 150, and the transmitter 140 may transmit the remodified object content 230 to the smartphone 400.

As a result, the electronic device 1000 according to the embodiment of the present disclosure may remodify the object content 230 by reflecting the augmented reality image 500 implemented on the smart wall pad 400 which is being driven, and then implement the remodified object content in the smartphone 400, so it is possible to easily check the state in which the delivering specific object is virtually installed around the user.

FIG. 11 is a diagram showing a fifth example of the state of using the electronic device according to the embodiment of the present disclosure.

Referring to FIG. 11, a fifth example of a state of using the electronic device 1000 according to the embodiment of the present disclosure will be described.

In this case, the hub 100 includes the collector 110, the storage 120, the modifier 130, and the transmitter 140. The augmented reality devices 200, 301, and 400 include the smart TV 200 and a smart refrigerator 700. In this case, the smart refrigerator 700 is also a refrigerator to which the above-described augmented reality technology is applied, and refers to a refrigerator that can check and update ingredients information stored therein in real time.

The collector 110 collects the broadcast content 210 implemented on the smart TV 200 which is being driven in real time and ingredients content 710 stored in the smart refrigerator 700, and the storage 120 stores the collected broadcast content 210 and ingredients content 710.

In addition, the modifier 130 modifies recipe content 720 of the broadcast content 210 and the ingredients content 710 so as to be implemented on the smart TV 200 when the smart TV 200 is driven, and the transmitter 140 transmits the modified recipe content 720 and ingredients content 710 to the smart TV 200.

According to the structure as described above, the smart TV 200 adds the ingredients content 710 to the recipe content 720 displayed in real time so as to be implemented as the augmented reality image 500.

For example, the user may find a specific recipe while watching the smart TV 200. In this case, the user may want to cook according to the recipe, and be curious about whether the ingredients necessary for the cooking are sufficiently stored in the refrigerator.

Accordingly, the electronic device 1000 according to the embodiment of the present disclosure may include the recipe content 720 of the broadcast content 210 implemented on the smart TV 200 and the ingredients content 710 implemented on the smart refrigerator 700, and then may add the modified content to the recipe content 720 displayed on the smart TV 200 so as to be implemented as the augmented reality image 500, thus enabling the specific recipe recognized while watching the smart TV 200 to be more easily applied.

While the foregoing has been given by way of illustrative example of the present disclosure, all such and other modifications and variations thereto as would be apparent to those skilled in the art are deemed to fall within the broad scope and ambit of this disclosure as is herein set forth. Accordingly, such modifications or variations are not to be regarded as a departure from the spirit or scope of the present disclosure, and it is intended that the present disclosure cover the modifications and variations of this disclosure provided they come within the scope of the appended claims and their equivalents.

What is claimed is:

1. An electronic device, comprising:
a hub; and
a plurality of augmented reality (AR) devices configured to transmit and receive data to and from the hub,
wherein the hub comprises:
  a collector configured to collect content implemented on the plurality of augmented reality devices;
  a storage configured to store the collected content;
  a modifier configured to modify the content to correspond to an event when the event occurs in at least one of the augmented reality devices; and
  a transmitter configured to transmit the modified content to at least one of the augmented reality devices,
wherein the plurality of augmented reality devices comprise a smart TV and a smart mirror based on augmented reality,
the collector collects broadcast content implemented on the smart TV which is being driven in real time,
the storage stores the collected broadcast content,
the modifier modifies clothing content of the broadcast content such that the clothing content is implemented on the smart mirror when the smart mirror is being driven,
the transmitter transmits the modified clothing content to the smart mirror, and
the smart mirror adds the clothing content to a user image input in real time and implements the clothing content as an augmented reality image.

2. The electronic device of claim 1, wherein the collector is further configured to automatically collect the content for each of the plurality of augmented reality devices which is being driven in real time.

3. The electronic device of claim 2, wherein the modifier is configured to individually modify the content according to each of the plurality of augmented reality devices which is being driven in real time.

4. The electronic device of claim 1, wherein the hub further comprises an input interface to which interaction information of the user regarding the content implemented in at least one of the augmented reality devices is input.

5. The electronic device of claim 4, wherein the modifier is configured to remodify the content by reflecting the interaction information input through the input interface.

6. The electronic device of claim 1, wherein the hub further comprises an input interface to which the augmented reality image implemented on the smart mirror which is being driven in real time is input, the modifier remodifies the clothing content such that the clothing content is implemented on the smart TV by reflecting the augmented reality image input through the input interface, and the transmitter transmits the remodified clothing content to the smart TV.

7. An electronic device, comprising:

a hub; and a plurality of augmented reality (AR) devices configured to transmit and receive data to and from the hub, wherein the hub comprises:

a collector configured to collect content implemented on the plurality of augmented reality devices;

a storage configured to store the collected content;

a modifier configured to modify the content to correspond to an event when the event occurs in at least one of the plurality of augmented reality devices; and a transmitter configured to transmit the modified content to at least one of the plurality of augmented reality devices, wherein the plurality of augmented reality devices comprise a smart TV and a smartphone based on augmented reality, the collector collects broadcast content implemented on the smart TV which is being driven in real time, the storage stores the collected broadcast content, the modifier modifies an object content of the broadcast content such that the object content is implemented in the smartphone when the smartphone is being driven, the transmitter transmits the modified object content to the smartphone, and the smartphone adds the object content to an image photographed in real time and implements the object content as an augmented reality image.

8. The electronic device of claim 7, wherein the hub further comprises an input interface to which the augmented reality image implemented on the smartphone which is being driven in real time is input, and the modifier remodifies the object content such that the object content is implemented on the smart TV by reflecting the augmented reality image input through the input interface, and the transmitter transmits the remodified object content to the smart TV.

9. An electronic device, comprising:

a hub; and a plurality of augmented reality (AR) devices configured to transmit and receive data to and from the hub, wherein the hub comprises:

a collector configured to collect content implemented on at least one of the plurality of augmented reality devices;

a storage configured to store the collected content;

a modifier configured to modify the content to correspond to an event when the event occurs in at least one of the plurality of augmented reality devices; and a transmitter configured to transmit the modified content to the augmented reality device, wherein the plurality of augmented reality devices comprise a first smart mirror and a second smart mirror based on augmented reality, the collector collects user content input to the first smart mirror which is being driven in real time, the storage stores the collected user content, the modifier modifies the user content such that the user content is implemented on the second smart mirror when the second smart mirror is being driven, the transmitter transmits the modified user content to the second smart mirror, and the second smart mirror adds the user content to a user image input in real time and then implements the user content as an augmented reality image.

10. The electronic device of claim 9, wherein the hub further comprises an input interface to which the augmented reality image implemented on the second smart mirror which is being driven in real time is input, the modifier remodifies the user content such that the user content is implemented on the first smart mirror by reflecting the augmented reality image input through the input interface, and the transmitter transmits the remodified user content to the first smart mirror.

11. An electronic device, comprising:

a hub; and a plurality of augmented reality (AR) devices configured to transmit and receive data to and from the hub, wherein the hub comprises:

a collector configured to collect content implemented on at least one of the plurality of augmented reality devices;

a storage configured to store the collected content;

a modifier configured to modify the content to correspond to an event when the event occurs in at least one of the plurality of augmented reality devices; and a transmitter configured to transmit the modified content to at least one of the plurality of augmented reality devices, wherein the plurality of augmented reality devices comprise a smart TV, a smartphone, and a smart wall pad based on augmented reality, the collector collects broadcast content implemented on the smart TV which is being driven in real time, and an object content implemented on the smartphone, the storage stores the collected broadcast content and object content, the modifier modifies delivery information content of the broadcast content and the object content such that the delivery information content and the object content are implemented on the smart wall pad when the smart wall pad is driven, the transmitter transmits the modified delivery information content and object content to the smart wall pad, and the smart wall pad adds the delivery information content and the object content to an output image displayed in real time and implements the delivery information content and the object content as an augmented reality image.

12. The electronic device of claim 11, wherein the hub further comprises an input interface to which the augmented reality image implemented on the smart wall pad which is being driven in real time is input, the modifier remodifies the delivery information content such that the delivery information content is implemented on the smart TV by reflecting the augmented reality image input through the input interface, and the transmitter transmits the remodified delivery information content to the smart TV.

13. The electronic device of claim 11, wherein the hub further comprises an input interface to which the augmented reality image implemented on the smart wall pad which is being driven in real time is input, the modifier remodifies the object content such that the object content is implemented on the smartphone by reflecting the augmented reality image input through the input interface, and the transmitter transmits the remodified object content to the smartphone.

14. An electronic device, comprising:

a hub; and a plurality of augmented reality (AR) devices configured to transmit and receive data to and from the hub, wherein the hub comprises:

a collector configured to collect content implemented on the plurality of augmented reality devices;

a storage configured to store the collected content;

a modifier configured to modify the content to correspond to an event when the event occurs in at least one of the plurality of augmented reality devices; and a transmitter configured to transmit the modified content to at least one of the plurality of augmented reality devices, wherein the plurality of augmented reality devices comprise a smart TV and a smart refrigerator based on augmented reality, the collector collects broadcast content implemented on the smart TV which is being driven in real time, and ingredients content stored in the smart refrigerator, the storage stores the collected broadcast content and ingredients content, the modifier modifies recipe content of the broadcast content, and the ingredients content, such that the recipe content and the ingredients content are implemented on the smart TV when the smart TV is being driven, the transmitter transmits the modified recipe content and ingredients content to the smart TV, and the smart TV implements the ingredients content as an augmented reality image by adding the ingredients content to the recipe content displayed in real time.

* * * * *